US008254346B2

(12) United States Patent
Karaoguz et al.

(10) Patent No.: US 8,254,346 B2
(45) Date of Patent: Aug. 28, 2012

(54) COMMUNICATION SYSTEM AND METHOD FOR DISCOVERING END-POINTS THAT UTILIZE A LINK LAYER CONNECTION IN A WIRED/WIRELESS LOCAL AREA NETWORK

(75) Inventors: Jeyhan Karaoguz, Irvine, CA (US); Richard Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 1722 days.

(21) Appl. No.: 10/606,503

(22) Filed: Jun. 26, 2003

(65) Prior Publication Data

US 2004/0054820 A1    Mar. 18, 2004

Related U.S. Application Data

(60) Provisional application No. 60/411,261, filed on Sep. 17, 2002, provisional application No. 60/411,301, filed on Sep. 17, 2002, provisional application No. 60/435,984, filed on Dec. 20, 2002.

(51) Int. Cl.
*H04W 4/00* (2009.01)
(52) U.S. Cl. ........ 370/338; 370/310; 370/312; 370/432; 370/445; 370/480; 370/245; 370/313
(58) Field of Classification Search .................. 370/310, 370/312, 432, 445, 480, 245, 313
See application file for complete search history.

(56) References Cited

U.S. PATENT DOCUMENTS

| 4,481,670 | A | * | 11/1984 | Freeburg | 455/69 |
|---|---|---|---|---|---|
| 5,638,412 | A | * | 6/1997 | Blakeney et al. | 375/377 |
| 5,812,531 | A | * | 9/1998 | Cheung et al. | 370/255 |
| 5,896,373 | A | * | 4/1999 | Mitts et al. | 370/331 |
| 5,926,462 | A | * | 7/1999 | Schenkel et al. | 370/254 |
| 5,969,678 | A | * | 10/1999 | Stewart | 342/457 |
| 6,049,533 | A | * | 4/2000 | Norman et al. | 370/328 |
| 6,208,634 | B1 | | 3/2001 | Boulos | 370/342 |
| 6,353,412 | B1 | | 3/2002 | Soliman | 342/387 |
| 6,445,688 | B1 | * | 9/2002 | Garces et al. | 370/334 |
| 6,522,877 | B1 | * | 2/2003 | Lietsalmi et al. | 455/422.1 |
| 6,552,877 | B2 | * | 4/2003 | Tokuyama et al. | 360/245.7 |
| 6,571,221 | B1 | * | 5/2003 | Stewart et al. | 705/52 |
| 6,621,809 | B1 | * | 9/2003 | Lee et al. | 370/335 |
| 6,763,195 | B1 | * | 7/2004 | Willebrand et al. | 398/115 |
| 6,888,811 | B2 | * | 5/2005 | Eaton et al. | 370/338 |
| 7,143,171 | B2 | * | 11/2006 | Eriksson et al. | 709/227 |
| 7,164,663 | B2 | * | 1/2007 | Frank et al. | 370/328 |

(Continued)

FOREIGN PATENT DOCUMENTS

EP     0631451 A2    12/1994

(Continued)

*Primary Examiner* — Phirin Sam
*Assistant Examiner* — Blanche Wong
(74) *Attorney, Agent, or Firm* — Garlick & Markison; Holly L. Rudnick

(57) ABSTRACT

Aspects of the invention provide a communication system and method in a hybrid wired/wireless local area network. At least one discovery message may be broadcasted to at least one of a plurality of access points. A response may be received from one or more of the access points. The response may report a presence of at least one access device located within a coverage area of one or more of the access points. A status of at least one access device located within a coverage area of one or more of the access points may be requested from the access points.

20 Claims, 11 Drawing Sheets

U.S. PATENT DOCUMENTS

| | | | |
|---|---|---|---|
| 7,274,934 B2 * | 9/2007 | Arazi et al. | 455/436 |
| 7,734,018 B2 * | 6/2010 | Light et al. | 379/32.04 |
| 2001/0044295 A1 | 11/2001 | Saito | 455/410 |
| 2003/0226033 A1 * | 12/2003 | Zinda et al. | 713/201 |
| 2004/0001467 A1 * | 1/2004 | Cromer et al. | 370/338 |
| 2004/0005859 A1 * | 1/2004 | Ghercioiu et al. | 455/3.01 |
| 2004/0034705 A1 * | 2/2004 | Focsaneanu | 709/225 |
| 2004/0203787 A1 * | 10/2004 | Naghian | 455/437 |
| 2004/0203818 A1 * | 10/2004 | Cromer et al. | 455/452.1 |

FOREIGN PATENT DOCUMENTS

| | | |
|---|---|---|
| WO | 9726771 A | 7/1997 |

\* cited by examiner

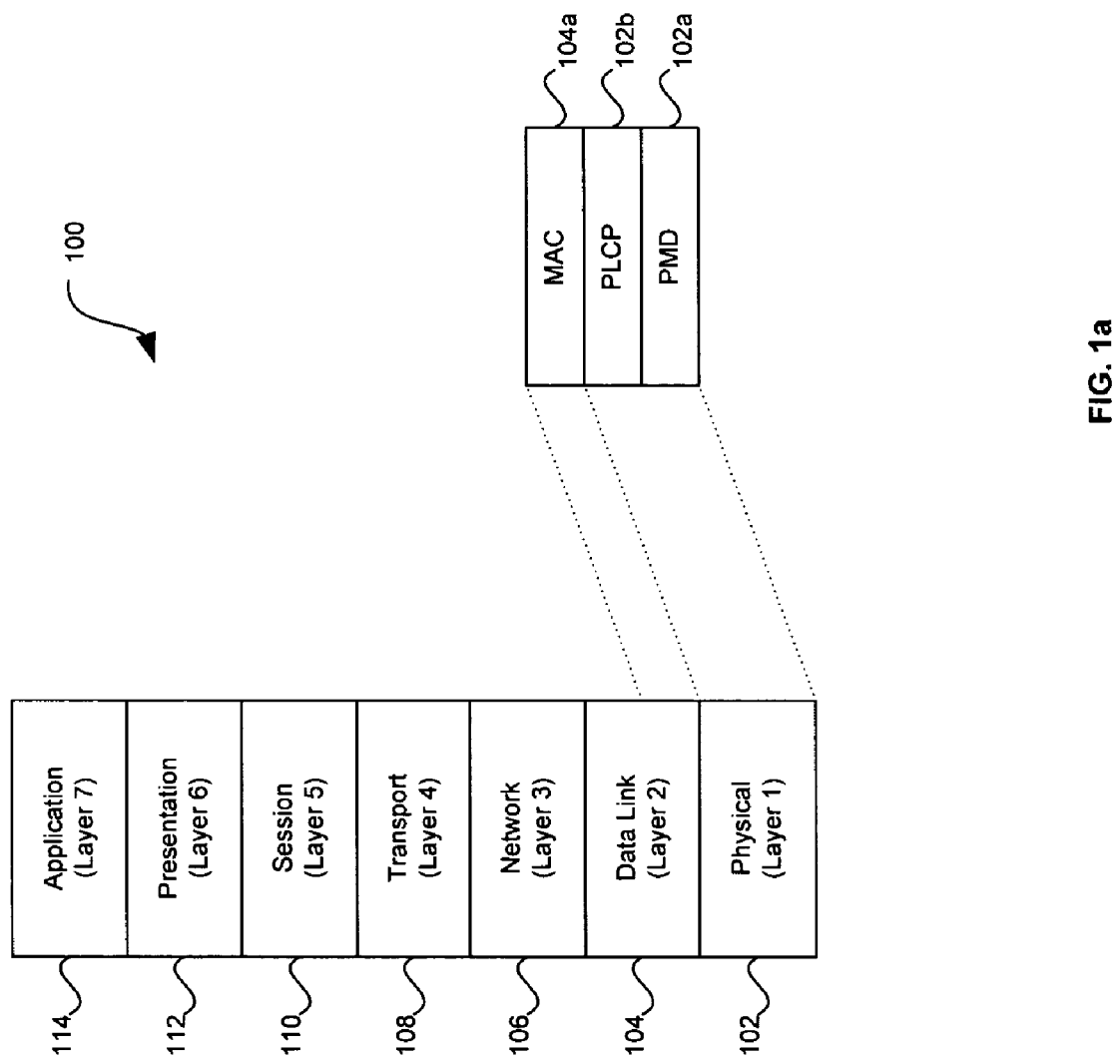

COMMUNICATION SYSTEM AND METHOD FOR DISCOVERING END-POINTS THAT UTILIZE A LINK LAYER CONNECTION IN A WIRED/WIRELESS LOCAL AREA NETWORK

CROSS-REFERENCE TO RELATED APPLICATIONS/INCORPORATION BY REFERENCE

This application makes reference to, claims priority to and claims the benefit of:

U.S. Provisional Patent Application Ser. No. 60/411,261 entitled "Communications Systems Software and Protocols" filed on Sep. 17, 2002;

U.S. Provisional Patent Application Ser. No. 60/411,301 entitled "Method and System for Providing a Scalable Integrated Switch and Wireless Architecture" filed on Sep. 17, 2002; and U.S. Provisional Application Ser. No. 60/435,984 entitled "Communication System and Method in a Wireless Local Area Network" filed on Dec. 20, 2002.

The above stated applications are all incorporated herein by reference in their entirety.

BACKGROUND OF THE INVENTION

Embodiments of the present application relate generally to local area networks, and more particularly to a communication method and system in a hybrid wired/wireless local area network (WLAN).

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of 19 meters (m) in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA) for distribution coordination function (DCF) and point coordination function (PCF).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, CSMA/CA or a ready to send (RTS) and clear to send (CTS) messaging scheme is employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes phase-shift keying (PSK) as a modulation scheme, 802.11b utilizes a hybrid PSK scheme called complementary code keying (CCK). CCK permits higher data rate and particularly less susceptible to interference effects such as multipath-propagation interference, the PSK.

The 802.11a standard provides wireless asynchronous transfer mode (ATM) support and is typically utilized in access hubs. 802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a along with its shorter operating range, may significantly increase deployment cost since a larger number of access points are required to service a given service area.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a communication system and method in a hybrid wired/wireless local area network. At least one discovery message may be broadcasted to at least one of a plurality of access points. A response may be received from one or more of the access points. The response may report a presence of at least one access device located within a coverage area of one or more of the access points. A status of at least one access device located within a coverage area of one or more of the access points may be requested from the access points.

The requesting step may further include the step of sending at least one status request message to one or more of the access points within whose coverage area the access device may be located. At least one status reply message indicating a status of the access devices may be received from one or more of the access points within whose coverage area the access device may be located. The discovery message, the status request message and the status reply message may be a messaging protocol message. The discovery message may be broadcasted from a server, a switch and/or any one of the access points. In another aspect of the invention, the discovery message may only be broadcasted to access points located in a particular subnetwork.

Another embodiment of the invention provides a non-transitory machine-readable storage, having stored thereon a computer program having at least one code section for providing communication in a hybrid wired/wireless local area network, the at least one code section executable by a machine for causing the machine to perform the steps described above.

Another embodiment of the invention provides a communication system in a hybrid wired/wireless local area network.

The system may include at least one broadcaster adapted to broadcast at least one discovery message to at least one of a plurality of access points. At least one receiver may be adapted to receive a response from one or more of the access points. The response may report the presence of at least one access device located within a coverage area of the access points. A requester may be adapted to request from one of the access points, a status of at least one access device located within a coverage area of one of the access points. The requester may include a sender adapted to send at least one status request message to one or more access points within whose coverage area the access device may be located.

At least one receiver may be adapted to receive one or more status reply messages indicating a status of one or more access devices located within a coverage area of one or more of the access points. The discovery message, status request message and status reply message may be a messaging protocol messages. The at least one broadcaster may be further adapted to broadcast the discovery message from a server, a switch and/or one of the access points. In another aspect of the invention, the broadcaster may be further adapted to broadcast the discovery message to only those access points located in a particular subnetwork.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1a is a block diagram of the OSI model.

DETAILED DESCRIPTION OF THE INVENTION

Aspects of the invention provide a communication system and method in a hybrid wired/wireless local area network. At least one discovery message may be broadcasted to at least one of a plurality of access points. A response may be received from one or more of the access points. The response may report a presence of at least one access device located within a coverage area of one ore more of the access points. A status of at least one access device located within a coverage area of one or more of the access points may subsequently be requested from the access points.

Figure 1B:
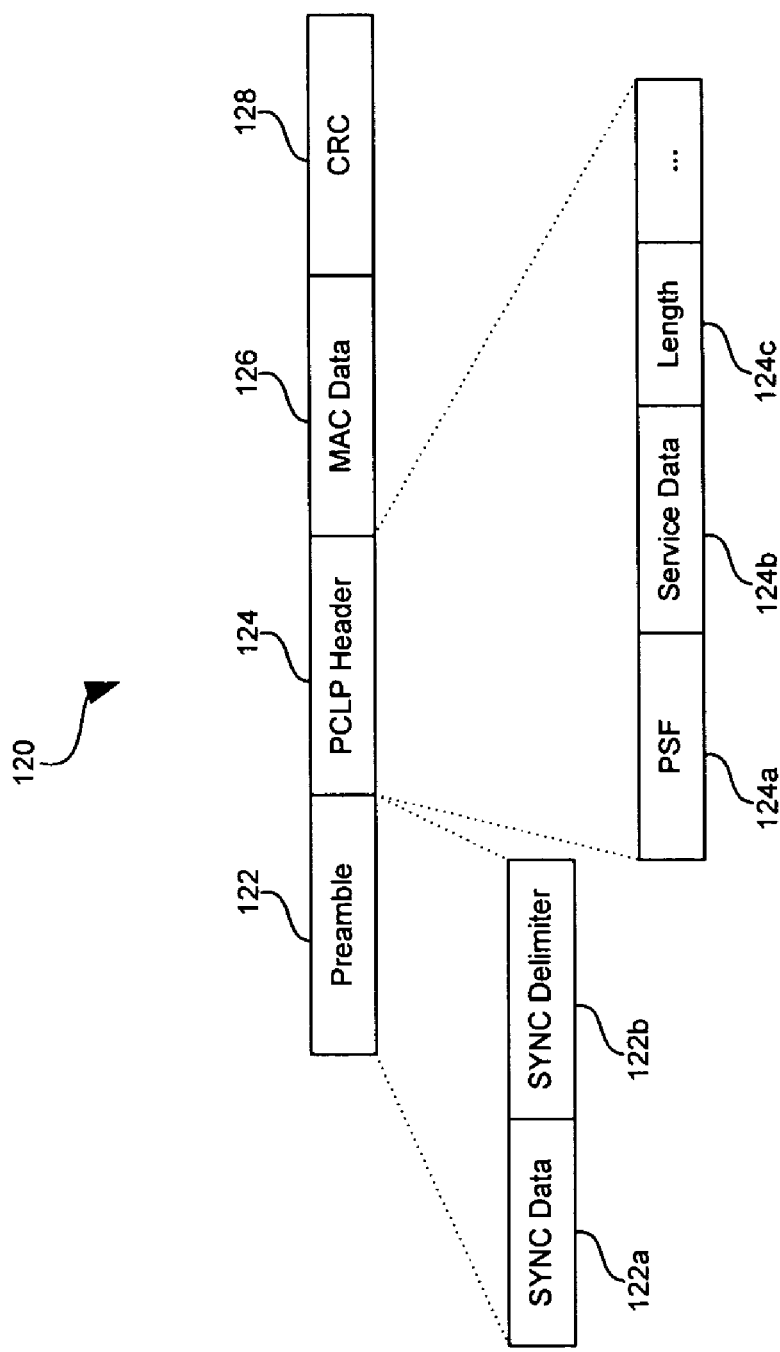
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
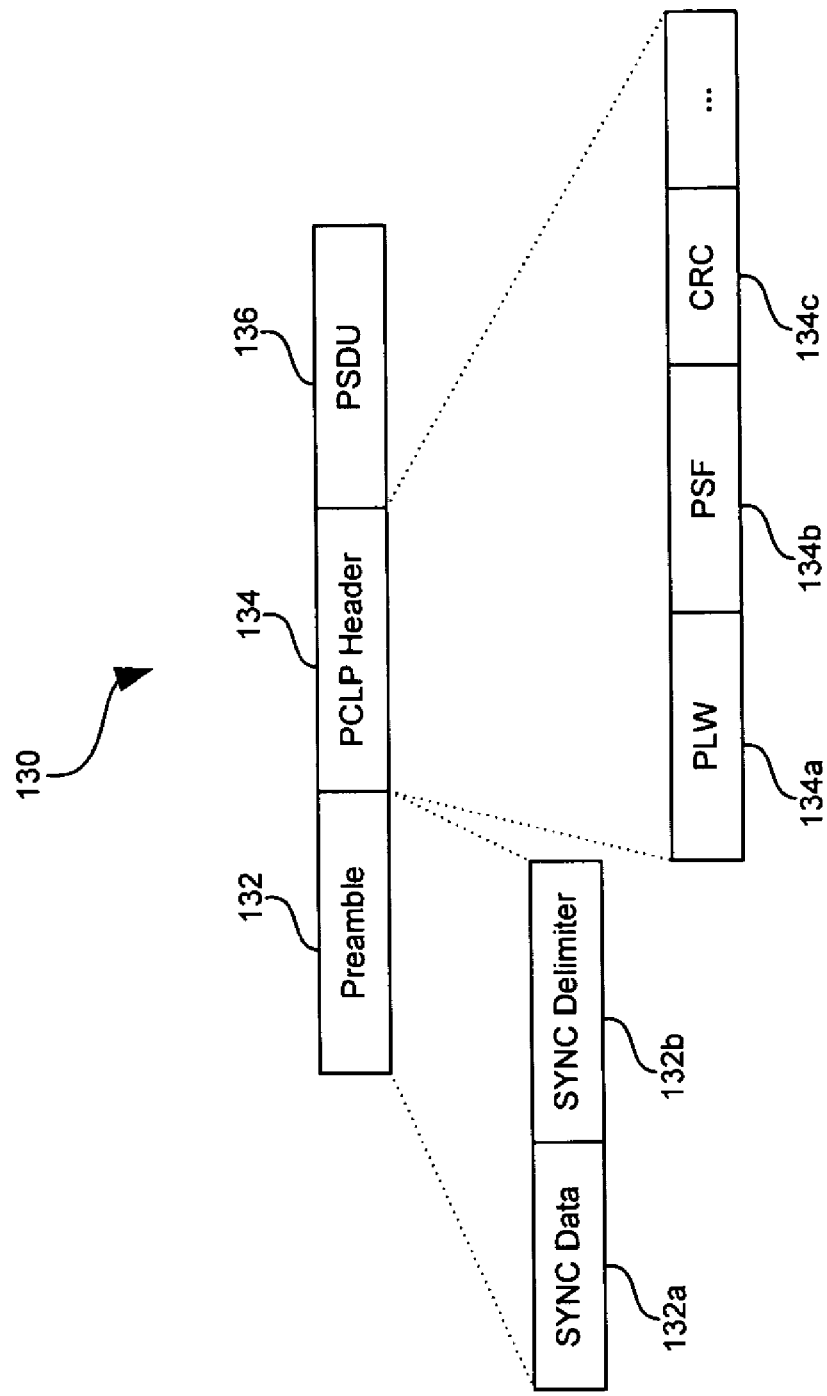
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134 be may be 4-bits in length and may be used to denote the communication data rate.

Figure 1D:
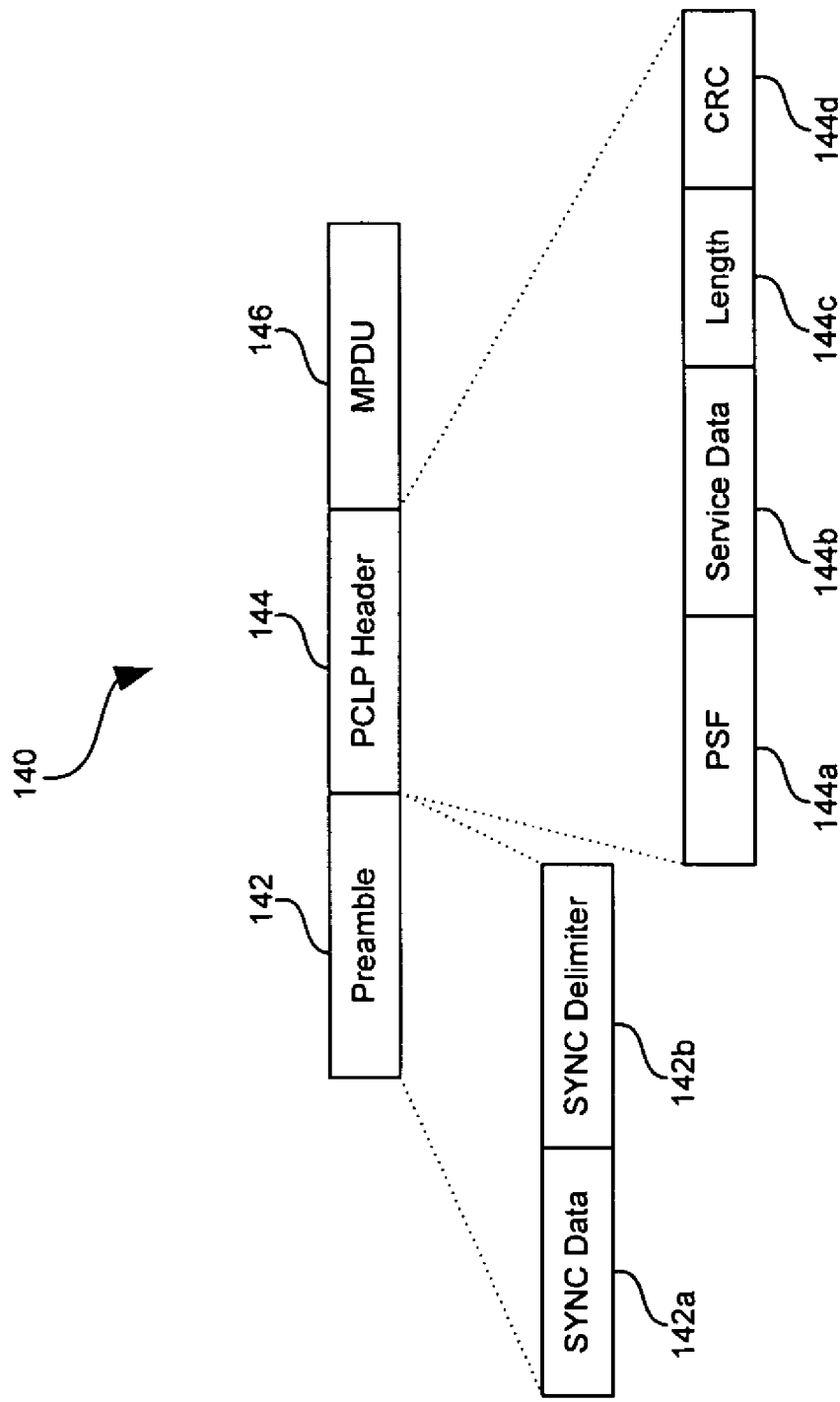
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
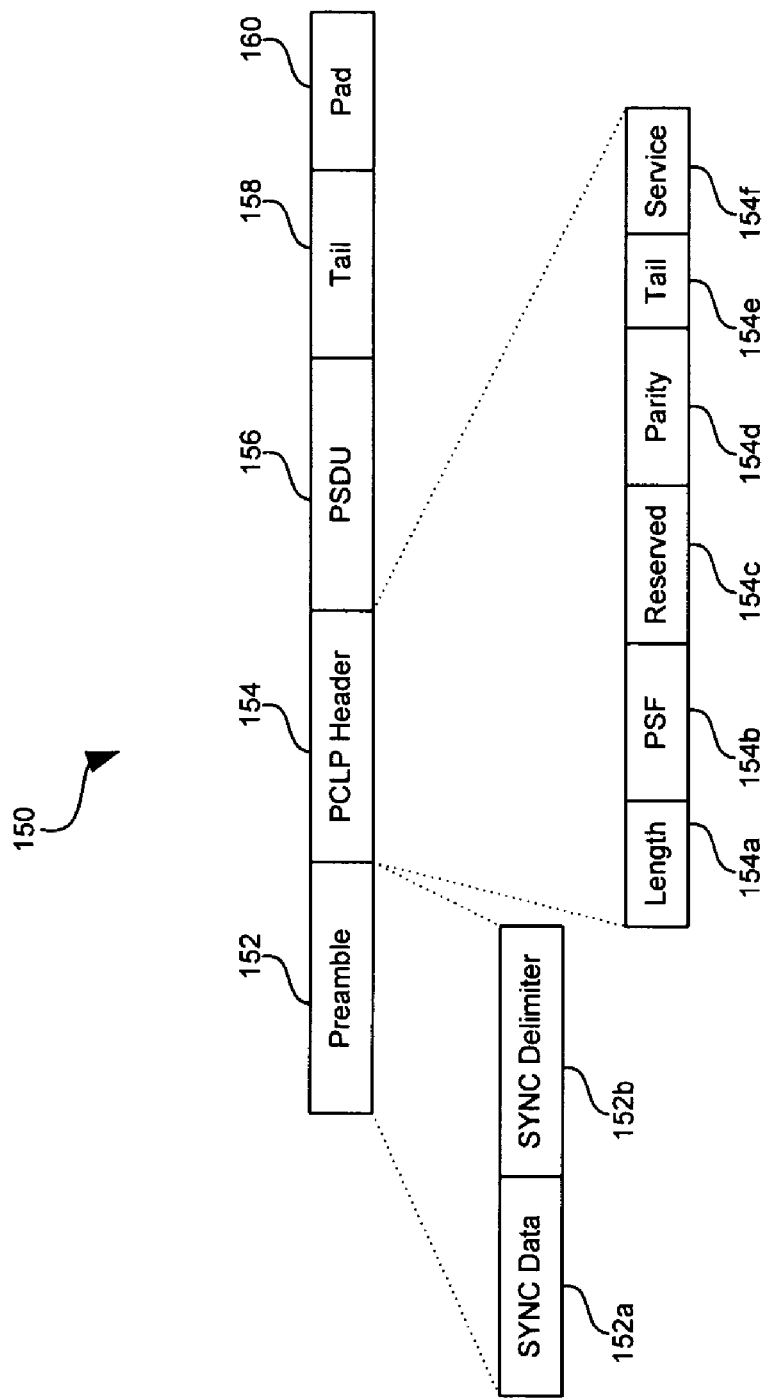
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical wireless local area network, especially as access devices become mobile throughout the network, channel capacity may be rapidly time varying. For example, when the distance from an access device to an access point increases or decreases due to mobility, the channel capacity and ultimately the channel throughput may change with time. In accordance with an embodiment of the invention, a switch for example, may utilize the messaging protocol to facilitate communication between one or more of a plurality of access devices and/or access points, and/or other switches. The messaging protocol may be adapted to provide, for example, switch filter transfer, bandwidth management, session control and management, load balancing and QoS control and management.

In for example, a hybrid wired/wireless in which bandwidth is rapidly changing over time due to access device mobility, the messaging protocol in accordance with an aspect of the invention may be adapted to perform bandwidth management for a wired and/or a wireless portion of the network. The bandwidth management may include, but is not limited to, performing one or more tasks including, but not limited to, implementing policies, tracking bandwidth usage and adapting bandwidth allocation to meet user demands and system capability. The management of these tasks may pertain to providing mobility and operability throughout a hybrid wired/wireless communications network.

Figure 2:
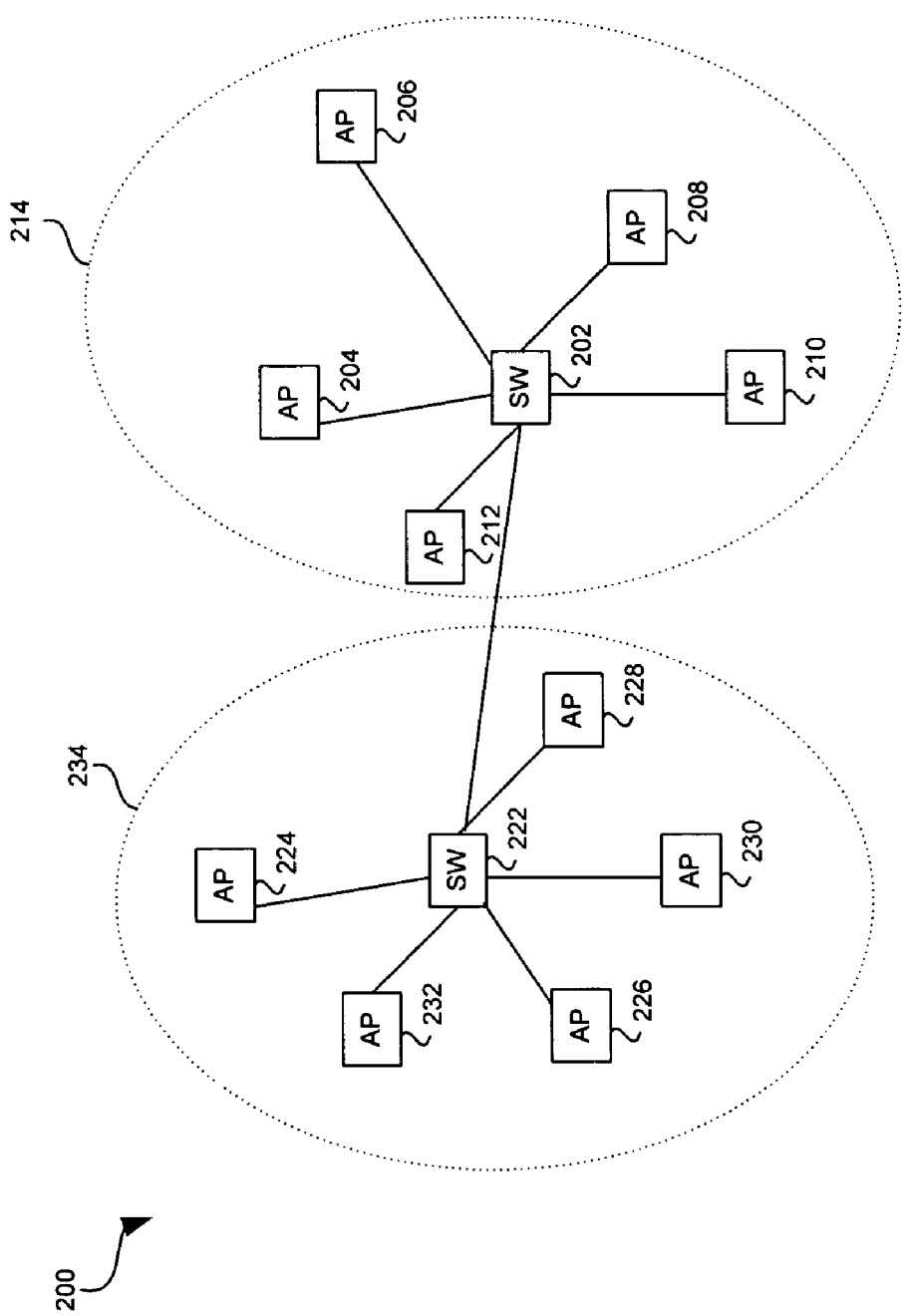
FIG. 2 is a block diagram of an exemplary system for network management in a wireless local area network in accordance with an embodiment of the invention.

FIG. 2 is a block diagram of an exemplary system for network management in a wireless local area network in accordance with an embodiment of the invention. Referring to FIG. 2, there is illustrated a first networking domain 214 and a second networking domain 234. The first networking domain 214 may include a switch 202, and access points 204, 206, 208, 210, 212. Each of access points 204, 206, 208, 210, 212 may be coupled to the switch 202. The second networking domain 234 may include a switch 222, and access points 224, 226, 228, 230, 232. Each of access points 224, 226, 208, 230, 232 may be coupled to the switch 222. Switch 222 may be coupled to switch 202 through any one or more of a wired and a wireless medium. Although not shown, at least some of the access points in any one of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity.

In operation, any one or more of the access points in any one or more of the networking domains 214, 234 may be adapted to receive network management related information and parameters from one or more of the switches 202, 222. In one embodiment of the invention, for example, access point 206 may be adapted to receive for example, bandwidth information from switch 202. Similarly, any one or more of access points 204, 208, 210, 214 may receive network management related information from switch 202. Similarly, any one or more of access points 224, 226, 228, 230, 232 may receive network management related information from switch 222.

In another aspect of the invention, the switches 202, 222 may be adapted to provide, for example, certain QoS management activities to the access points using the messaging protocol in accordance with an aspect of the invention. Accordingly, some activities such as bandwidth policing, bandwidth management, load balancing, roaming and handover may be handled by coordinating one or more switches and one or more access points utilizing the messaging protocol in accordance with an embodiment of the invention. Notwithstanding, a switch for example 222, may be adapted to establish rules that may be adapted by the access points 224, 226, 228, 230, 232 in carrying out these activities. The rules may be propagated from the switches 222, 202 to the access points 204, 208, 210, 214, 224, 226, 228, 230, 232 using the messaging protocol. Prioritization and processing, for example, may be based on acceptable levels of latency and bandwidth availability. For example, an IP telephone call may be assigned highest queuing and processing priority in order to minimize latency. Policing, for example, may include tasks which limit and control the usage of available bandwidth by a particular access device or a type of access device. All these tasks may be controlled using the messaging protocol.

In accordance with an aspect of the invention, the messaging protocol (MP) may be utilized for communication by an access device in for example, an enterprise Wireless LAN (WLAN), in order to provide services such as enhanced WLAN service to access devices or mobile stations. The communication, in addition to ordinary WLAN device communication such as authentication, authorization, key exchanges, beacon broadcast, etc., may provide additional features not provided by a WLAN to its clients. These additional features may include, but are not limited to, access control, load balancing, network management and quality of service. Enterprise WLAN devices that may utilize messaging protocol message transactions may include but are not limited to, wireless access points, enterprise switches, and wireless stations. These devices may be MP enabled in some instances.

In accordance with the invention, an exemplary WLAN Architecture may be provided. In the enterprise Wireless LAN environment, the wireless devices may be located at the edge of the network. The wireless devices may be connected or coupled to the enterprise network via one or more access points, which in turn may be the edge devices of, for example, a wired LAN. The access points may be connected to the LAN via switches. These switches, called Wireless LAN Switches, in certain instances, do not only perform Layer 2 switching, but may be adapted to function as a wireless edge manager. They may also provide additional functionalities like access control, firewall functions, traffic privacy and quality of service, network management, and load balancing.

Figure 3:
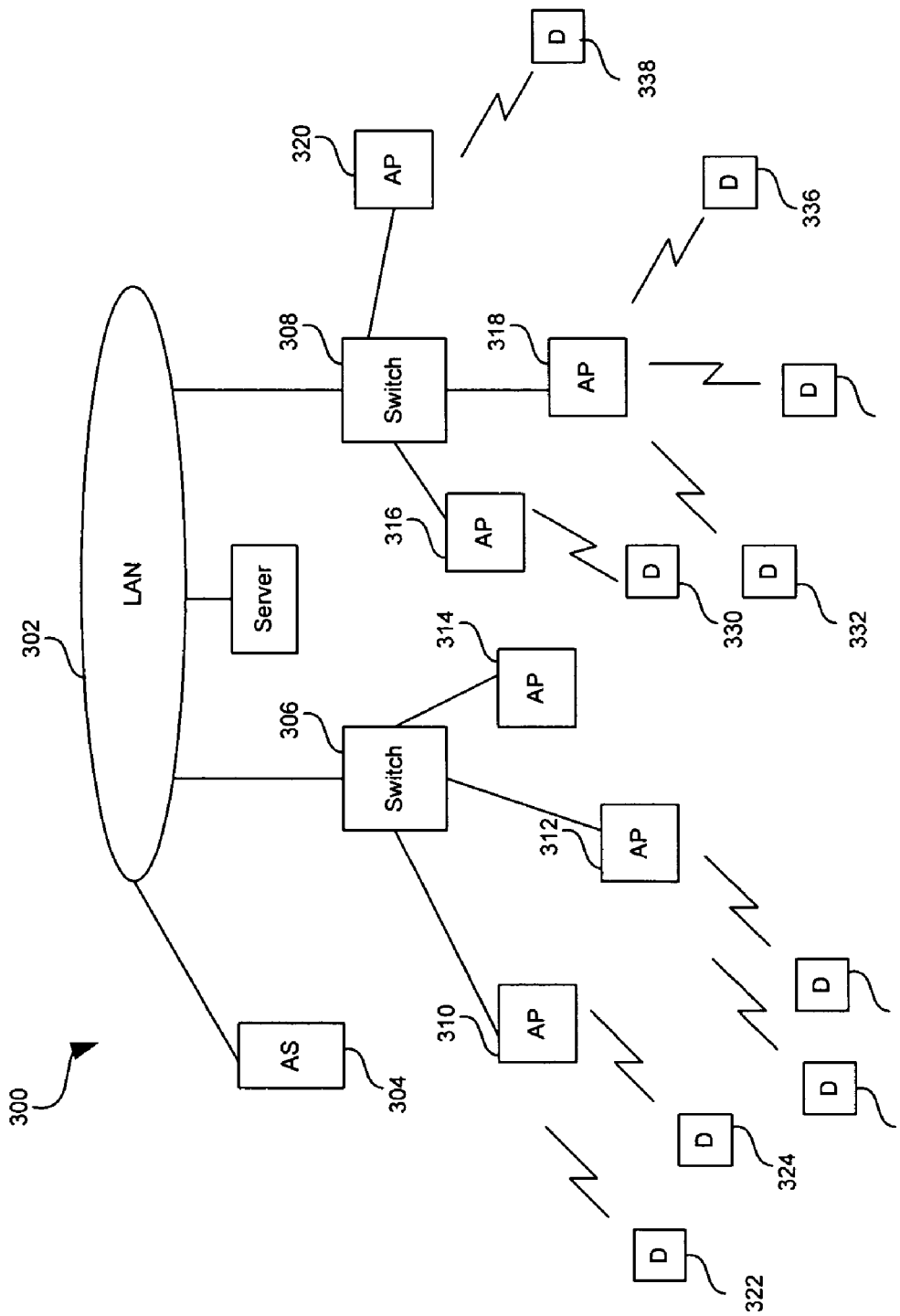
FIG. 3 is a block diagram of an exemplary Enterprise Wireless LAN having switches serving as the edge managers in accordance with an embodiment of the invention.

FIG. 3 is a block diagram 300 of an exemplary Enterprise Wireless LAN having switches serving as the edge managers in accordance with an embodiment of the invention. Referring to FIG. 3, there is shown, a local area network (LAN) 302, authentication server 304, switches 306, 308, access points (APs) 310, 312, 314, 316, 318, 320 and access devices 322, 324, 326, 328, 330, 332, 334, 336, 338. It should be recognized that the invention is not limited to and Enterprise WLAN. The invention may be applicable to a wired LAN, a wireless LAN and any combination thereof.

Wireless transmission or communication between the access devices or clients, and the access points may be secure. This may be also be true for the wired connections between any of the access points 310, 312, 314, 316, 318, 320 and the switches 306, 308. The switches 306, 308 and access points 310, 312, 314, 316, 318, 320 may be adapted to communicate using, for example, an Ethernet protocol. From the switch's perspective, the switch may be switching regular layer 2 frames. Within the switch, knowledge of a WLAN and its management intelligence may reside primarily in software.

The messaging protocol, in accordance with an aspect of the invention, may be adapted to utilize one or more protocols associated with a device communication protocol (DCP) umbrella (DCPU). The messaging protocol may be adapted to run over the transmission control protocol (TCP) or user datagram protocol (UDP) protocols using for example, a well-known port number specified under the framework of the device communication protocol. Under the DCP umbrella, there may be several sub-protocols defined for the purpose of facilitating interoperability with other products. Some of these products may include but are not limited to, cable modems and cable modem termination systems (CMTS) equipment. The messaging protocol may be adapted to include the necessary protocols under DCP to facilitate communication for wired and/or WLAN devices.

DCP is a Layer 5 protocol. It may be adapted to use a default TCP/UDP port of for, example, 3188, which is a registered IETF port assignment. A DCP header, starting from the TCP/UDP payload, may have a 6-byte header as follows:

| RCM_MAGIC_NUMBER | RCM_SubProtocol | Sub_Protocol Specifics |
|---|---|---|
| octets 0-3 (=0x4252434d, or "RCM") | octets 4-5 | Variant # octets |

The RCM_SubProtocol field may indicate an officially registered sub-protocol for other devices. Exemplary valid values may be illustrated in the following table:

| RCM_SubProt c l | Description |
|---|---|
| 0x0000 | Reserved |
| 0x0001 | Propane Control Protocol (PCP) |
| 0x0002 | Inter-CMTS Communications Protocol (ICCP) |
| 0x0003 | imPulse Mitigation Signaling Protocol (PMSP) |
| 0x0004 | Loadbox Signaling Protocol (LBSP) |
| 0x0005 | Propane Testing Protocol (PTP) |
| 0xFFFE | Reserved |
| 0xFFFF | Reserved |

The message protocol may be adapted to register for a next available value for the RCM_SubProtocol. Message protocol specific information may be adapted to start at the $6^{th}$ octet in the DCP packet, al though the invention is not limited in this regard.

In accordance with an aspect of the invention, the messaging protocol may be utilized for communication between various wireless networking devices and/or clients. In an embodiment of the invention, the messaging protocol may be adapted to facilitate communication between various access points 310, 312, 314, 316, 318, 320 and WLAN switches 306, 308. Information exchanged between these two devices may include, but is not limited to, control, configuration and status information of the device or unit and client session information. The control information may include, for example, signaling information that may be communicated in-band or out-of-band. Such information may be exchanged in order to enable the six features mentioned in the previous section in the WLAN.

The messaging protocol may include a message type. The messaging protocol may include, for example six (6) categories of messages or message types, although the invention is not so limited. These messages and their usage may be illustrated as follows:

AP_Status: from AP to Switch or AP

An AP_Status message may be used to indicate, for example, an access point capacity, bandwidth allocation, the number of attached clients, signal strength, power levels, etc.

AP_Config: from Switch to AP

An AP_Config message may be used to configure an access point to accommodate a client. This may include but is not limited to, 802.11e QoS, security information, etc.

Switch_Status: from Switch to Switch

A Switch_Status message may be used to indicate a switch's association with clients, including the client's session information, access control, QoS parameters, etc.

Switch_Config: from Switch to Switch

A Switch_Config message may be used to configure a WLAN Switch to accommodate a client, including access control, QoS configuration, etc.

Client_Status: from AP to Switch

A Client_Status message may be used to indicate a client's information, including client identification, associated MAC address, session status, connecting location, etc.

Device_Discovery: any Device to any Device

In a client-server model of network services, the Device_Discovery message may be used by a server to discover clients or by client to discover servers. The message may be broadcast to some or all devices in the subnet to draw responses from the intended devices.

In each of the message types above, the message may include, for example four (4) message subtypes—.request, data, alert, and ack. A message type/subtype pair of .request and .data may represent the request of data and a corresponding response of data itself. The subtype pair of .alert and .ack may represent the voluntary transmission of data and its acknowledgement. Additionally, there may be two conventions utilized in a message exchange sequence. Accordingly, if a message exchange sequence starts with a request (.req), it may be followed by a reactive transmission of data (.data). Similarly, if a message exchange sequence starts with a proactive transmission of data (.alert), it is followed by an acknowledgement (.ack).

Since the message protocol may be a sub-protocol of DCP, a messaging protocol message may have 6 octets at the front of the TCP/UDP Payload identifying it as a DCP packet. Starting from Octet 6 (0-based), at the beginning of a DCP payload, or a messaging protocol message, 3 octets may be reserved to indicate the message type of a messaging protocol message. In accordance with an aspect of the invention, a filtering engine in the network may be adapted to filter certain types of messaging protocol messages by examining the three octets of a messaging protocol message. In this regard, a messaging protocol message identification system may be implemented.

In accordance with an aspect of the invention, in a case where a message protocol (MP) message may be registered with a DCP sub-protocol value of, for example 0x0006, a typical messaging protocol message, as a continuation after the DCP header, may be as follows. Again, the beginning of the DCP header is the first byte of the TCP or UDP payload.

| RCM_MAGIC_NUMBER (octets 0-3) | RCM_SubProtocol (octets 4-5) | MP Message Identifier (octets 6-8) | MP Message Payload (variant # bytes) |
|---|---|---|---|
| 0x4252434d ("RCM") | 0x0006 | — | — |

The messaging protocol message identifier may specify a type of messaging protocol messages as addressed above. The messaging protocol message types may be enumerated in the following table.

| Message Type | value in first two octets of Message Identifier |
|---|---|
| AP Status | 0x0001 |
| AP Config | 0x0002 |
| Switch Status | 0x0003 |
| Switch Config | 0x0004 |
| Client Status | 0x0005 |
| Device Discovery | 0x0006 |

The 3$^{rd}$ byte of the messaging protocol message identifier may identify a sub-type of the messaging protocol Message. As addressed above, a messaging protocol message may be a data requisition, a data response, a data alert or an acknowledgement. The assigned values are given in the following table.

| Message Sub-type | value in third octet of Message Identifier |
|---|---|
| data request (.req) | 0x01 |
| data response (.data) | 0x02 |
| data alert (.alert) | 0x03 |
| acknowledgement (.ack) | 0x04 |

The messaging protocol message payload may be ASCII-based, similar to other IETF protocols such as, real-time streaming protocol (RTSP), hyper-text transport protocol (HTTP), session initiation protocol (SIP), etc. With an ASCII-based protocol, the parameters to be exchanged between devices may be formatted as follows:

<field{.subfield}>:<field value>

It should be recognized that the invention is not limited to the arrangement of the parameters as shown. Notwithstanding, a messaging protocol message in ASCII format may be recognized by inspection. Notably, the messaging protocol message format provides flexibility, in that future revision may be possible by adding new fields.

In accordance with an aspect of the invention, exemplary valid fields and subfields in a messaging protocol message may be as follows:

| Field | Subfields | Descriptions |
|---|---|---|
| Transaction_ID | — | a unique ID identifying the request/data sequence or data/ack sequence |
| Session | ID | a unique ID identifying an association session that the wireless user engaged to the WLAN, this may be a Wireless Laptop logging in, a powered on Wireless VOIP phone, a Wireless PCS, etc. |
|  | Switch_ID | the WLAN switch that governs this session |
|  | AP_ID | the AP associated with this session |
|  | Client_MAC | the client MAC address |
|  | Status | status of a session, whether the wireless station is connected to the network, disconnected from the network, or no traffic has been transmitted in this session; from an AP's perspective, it may be associated or disassociated with the session |
|  | Status_Duration | the time-duration that has reached the status |
|  | Password | password that allows a client station to join the network |
|  | Access_Level | level of access allowed for this client session |
|  | Access_Duration | Duration of access allowed |
|  | Access_Start_TOD | TOD that access may begin |
|  | Access_End_TOD | TOD that access must end |
|  | Signal | the signal strength of the wireless station received; strongest possible signal = 100 |
| Device | Type | Device type; in the WLAN architecture, it may be all permissible devices, like a switch, an AP, a laptop, a phone, a PCS, etc. |
|  | Identity | Device ID |
|  | Password | password that allows the device to join the network |
| Target_Device | Type | Used for Device Discovery, Discovery broadcast is meant for a certain type of target device. |
|  | Identity | Device ID |
|  | Address_Filter | IP Subnet filter such that only addresses filtered through need to respond; this filter is normally an IP subnet address, e.g. 192.168.3.xx, or a manufacturer-specific MAC address, e.g. 00-10-18-XX-XX-XX |
|  | Filter_Type | Type of filter, such as IP address or MAC address |
| MAC | — | MAC address of wireless station |
| IP_Addr | — | IP address of wireless station |
| QoS | priority | priority/class given to a specific flow |
|  | 802.11e | QoS scheme used by an AP, either EDCF or HCF |
| bitrate | max | maximum bandwidth (in Kbps) allowed for a specific flow |
|  | Min | minimum bandwidth (in Kbps) allocated to a specific flow |
|  | burst_size | maximum burst size for the traffic flow |
| key | value | encryption key for a particular client |
|  | time | time left (in seconds) of the key |
| IP_Subnet | — | IP subnet that a wireless client may be access |
| VLAN | — | VLAN that a wireless client is associated to |

-continued

| Field | Subfields | Descriptions |
|---|---|---|
| Flow_Stats | Byte_Count | the number of bytes transmitted for a flow |
| | Packet_Count | the number of packets transmitted for a flow |
| | Drop_Count | the number of packets discarded for a flow |
| | ReMark_Count | the number of packets remarked for a flow |
| | Duration | the time duration for the flow stats since the last reset |
| Class_Stats | Byte_Count | the number of bytes transmitted for a class |
| | Packet_Count | the number of packets transmitted for a class |
| | Drop_Count | the number of packets discarded for a class |
| | ReMark_Count | the number of packets remarked for a class |
| | Duration | the time duration of the class stats since the last reset |
| Roaming | Current_AP | identity of the AP the wireless station is about to disassociate |
| | New_AP | identity of the AP the wireless station is about to associate |
| Classifier | DA | Destination MAC address |
| | SA | Source MAC address |
| | VLAN_ID | VLAN ID |
| | Src_IP | Source IP address to be filter by switch |
| | Dest_IP | Destination IP address to be filtered by switch |
| | Src_Port | Source Port to be filtered by switch |
| | Dest_Port | Destination port to be filtered by switch |
| | Protocol | Layer IV protocol (field in Layer III IP header) to be filtered by switch |
| Filter | Action | Action field when there is an in-profile filter match |
| | Out_Action | Action field when there is an out-profile filter match |
| | 802.1p | 802.1p priority field to be changed as a result of a filter match |
| | DSCP | DSCP field to be changed as a result of a filter match |
| | TOS | TOS field to be changed as a result of a filter match |

In accordance with an embodiment of the invention, the messaging protocol may be adapted to discover an access device or client in a WLAN. In this regard, it may be necessary to discover which one or more of a plurality of access points may be a associated with a client device. In a case where an access device may be within a coverage area of one or more access points, the whereabouts of a client device may be derived from this discovered access point associations. For example, in a case where access points from three (3) different locations receive strong signals from a particular client device, but no other access point receives any signal from that particular client device, then the client device may be located in a zone where coverage for the three (3) access points overlap. An actual location of the client device may subsequently be decided by, for example, a server, a switch and/or an access point, after requesting and receiving various information from at least one of the three (3) access points. Although the server may be a separate network entity, it may be coupled to and/or associated with the switch and/or the access point.

Figure 4:
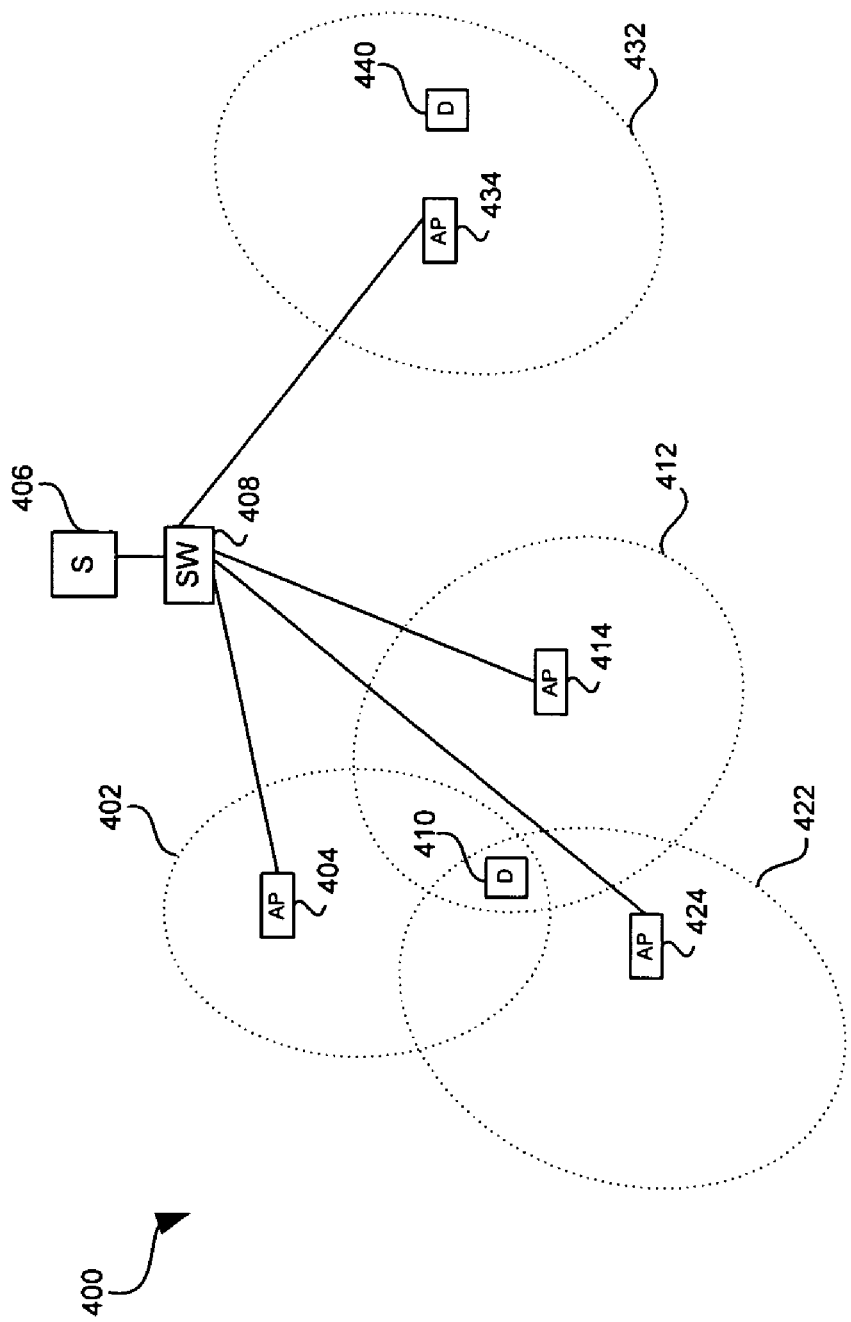
FIG. 4 is a block diagram of an exemplary hybrid wired/wireless network which may be used to illustrate the discovery of access devices in accordance with an aspect of the invention.

FIG. 4 is a block diagram 400 of an exemplary hybrid wired/wireless network which may be used to illustrate the discovery of access devices in accordance with an aspect of the invention. Referring to FIG. 4, there is shown a switch 408, a server 406, access points 404, 414, 424, 434, and access devices 410, 440. Access points 404, 414 and 424 have respective coverage areas 402, 412 and 422. Access device 410 may be positioned in a location where the coverage areas of access points 404, 414 and 424 overlap. In this regard, access device 410 may be located in the overlapping region of coverage areas 402, 412 and 422. Access device 440 may be located in the coverage are 432 of access point 434. The server 406 may be associated with a switch and/or an access point and may be separate from or integrated therein. In an alternative embodiment of the invention, the functions of the server 406 may be integrated within an access point and/or a switch, thereby eliminating a need for a separate server to provide discovery functions.

In operation, server 406 may be adapted to broadcast a device discovery message, namely Device_Discovery, to some or all the access points in the network. For example, server 406 may broadcast a Device_Discovery to the access points 404, 414, 424 and 434, which may be served by switch 408. Based on any signals that the access points 404, 414, 424, 434 may receive from access devices in the coverage areas of the access points 404, 414, 424 and 434, each access point may respond to the Device_Discovery request initiated by the server 406. Notwithstanding, the scope of the invention is not limited to sending a Device_Discovery message only from the server 406.

The Device_Discovery message may be initiated by, for example, switch 408 and/or any one or more of the access points 404, 414, 424, 434. Each of the access points 404, 414, 424 and 434 may respond with at least an identity of any access device that may be located within the coverage area or zone of a particular access point. In this regard, access points 404, 414, and 424 may all report access device 410 as being in their coverage area. Access point 434 may report access device 440 as being within its coverage area. In accordance with an aspect of the invention, the server 406 may broadcast a Device_Discovery.req message to the access points 404, 414, 424, 434. Each of the access points 404, 414, 424 and 434 may respond with to the Device_Discovery message with a Device_Device.data message.

Upon receiving the response to the Device_Discovery message, the server 406 may send at least one AP_Status message to at least each of the access points that may report at least one access device located within its coverage area. In this regard, server 406 may send an AP_Status message to access points 404, 414, 424 and 434. The access points 404, 414, 424, 434 may respond with a AP_Status message, providing more detailed information related to the access device located within its coverage zone. In accordance with an aspect of the invention, the server 406 may send an AP_Status.req message to some or all of the access points that report at least one access device located within it coverage area. In this regard, server 406 may send an AP_Status.req message to access points 404, 414, 424 and 434. The access points 404, 414, 424, 434 may respond to the AP_Status.req with a AP_Status.data message.

Figure 5:
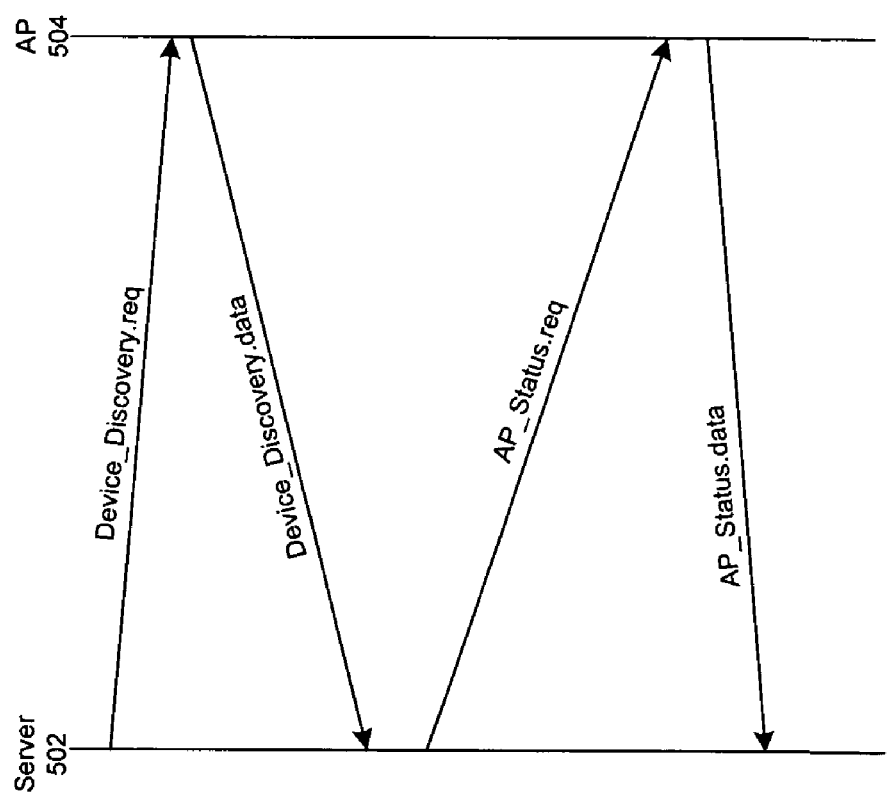
FIG. 5 is a high level block diagram of a exemplary message exchange that may be used to discover an access device in accordance with an aspect of the invention.

FIG. 5 is a high level block diagram of a exemplary message exchange that may be used to discover an access device in accordance with an aspect of the invention. Referring to FIG. 5, server 502 may send a Device_Discovery.req message to access point 504. Access point 504 may respond with a Device_Discovery.data message. Server 502 may send an AP_Status.req to access point 504. Access point 504 may respond with a AP_Status.data message. The following illustrates exemplary messaging protocol messages that may be utilized to discover a client device.

Device_Discovery.req
    Transaction_ID: 000123293
    Target_Device.Type: AP
    Target_Device.Address_Filter: 192.168.xx.xx
    Target_Device.Filter_Type: IP
    Target_Device.Identity: TBD
    Device_Discovery.data
    Transaction_ID: 000123293
    Target_Device.Type: AP
    Target_Device.Address_Filter: 192.168.xx.xx
    Target_Device.Filter_Type: IP
    Target_Device.Identity: AD-1002 AP_Status.req
    Transaction_ID: 000123294
    Session.Client_MAC: 23.EC.EB.14.1A.51
    Session.AP_ID: AD-1002
    Session.Status: TBD
    Session.Signal: TBD
    AP_Status.data
    Transaction_ID: 000123294
    Session.Client_MAC: 23.EC.EB.14.1A.51
    Session.AP_ID: AD-1002
    Session.Status: Associated
    Session.Signal: 85

In a case where another client device, for example AD-1082, also receives a strong signal from the client device, but the client device is not associated with that access point, the AP_Status.data response may have the following value:

Transaction_ID: 000123295
    Session.Client_MAC: 23.EC.EB.14.1A.51
    Session.AP_ID: AD-1082
    Session.Status: Not-associated
    Session.Signal: 79

In a case where another access point, for example AD-1203, does not get any signal from the client device, the AP_Status.data response may have the following value:

Transaction_ID: 000123296
    Session.Client_MAC: 23.EC.EB.14.1A.51
    Session.AP_ID: AD-1203
    Session.Status: Not-associated
    Session.Signal: 0

In another embodiment of the invention, the server 406 (FIG. 4) may initially broadcast at least one Device_Discovery message to all of the access points in a particular subnetwork. For illustrative purposes, access points 404, 414 and 424 may be located within IP subnetwork 192.168.xx.xx. In this regard, server 406 may broadcast a Device_Discovery message to the access points 404, 414 and 424 in the subnet. Each of the access points 404, 414, 424 may respond to the Device_Discovery message and may all report access device in their coverage area. In this case, access points 404, 414, 424 may report only access 410 as being in their coverage area. In accordance with an aspect of the invention, the server 406 may broadcast a Device_Discovery.req message to the access points 404, 414, 424. Each of the access points 404, 414, 424 may respond to the Device_Discovery message with a Device_Discovery.data message.

Responsive to replies associated with the Device_Discovery message, the server 406 may send individual AP_Status request messages to each access point, for example 404, 414, 424 located within the subnet. The AP_Status message may be sent only to those access points in the subnetwork that reported an access device within its coverage area. In this regard, server 406 may send an AP_Status message to access points 404, 414, and 424. The access points 404, 414, 424 in the subnetwork may respond with a AP_Status message, providing more information related to the access device located within its coverage zone. In accordance with an aspect of the invention, the server 406 may send an AP_Status.req message to at least each of the access points that report at least one access device located within it coverage area. In this regard, server 406 may send an AP_Status.req message to access points 404, 414 and 424. The access points 404, 414 and 424 may respond to the AP_Status.req with a AP_Status.data message.

In accordance with another embodiment of the invention, the messaging protocol may be adapted to discover a client device or access device within a wired portion of a wired/wireless LAN or a wired LAN. The client device or access device may be, for example an IP telephone. An IP telephone and an IP Telephony Gateway (IPTG) may both be message protocol-enabled. In this regard, the IP telephone and the IPTG may exchange messages whenever a client device is first connected to the wired LAN. When the IP telephone is coupled to the wired LAN, the IP telephone may first acquire an IP address. Subsequently, the IP telephone may be adapted to send a broadcast message to a subnet of the wired LAN in order to search for the IPTG serving the subnet of the wired LAN. Devices other than the IPTG may ignore the broadcast message. The IPTG may respond with its own client identification. Subsequently, the IP telephone may communicate call processing related messages with the IPTG.

Figure 6:
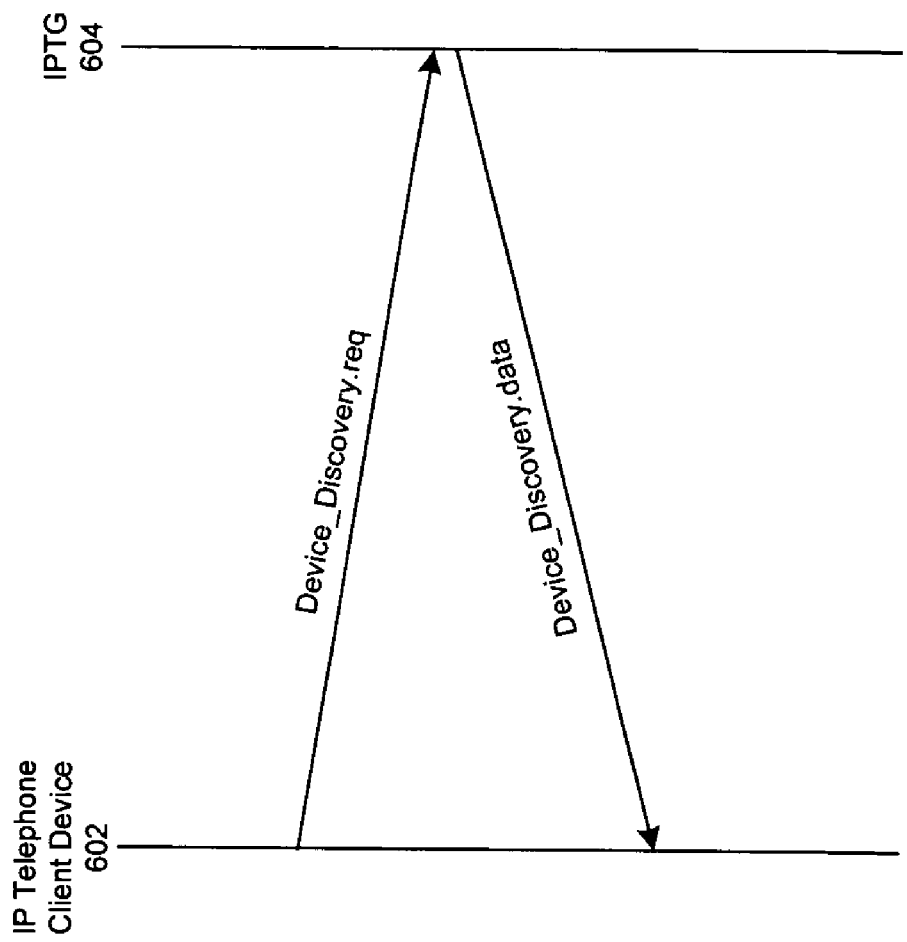
FIG. 6 is a diagram illustrating an exemplary message exchange for locating a wired client device using the messaging protocol in accordance with an embodiment of the invention.

FIG. 6 is a diagram illustrating an exemplary message exchange for locating a wired client device using the messaging protocol in accordance with an embodiment of the invention. In general, the client device 602 may first broadcasts a Device_Discovery message to the IP subnet of 192.168.xx.xx, in order to locate the serving IPTG 604. Based on responses associated with the broadcast Device_Discovery message, the IPTG 604 may identify itself with its IP address, for example 192.168.12.22. Referring to FIG. 6, the IP telephone client device 602 may send a Device_Discovery.req to the IPTG 604. The IPTG 604 may respond with a Device_Discovery.data message. The following is an exemplary messaging protocol message that may be utilized for locating a wired client device in accordance with an embodiment of the invention.

Device_Discovery.req
    Transaction_ID: 000138293
    Target_Device.Type: IPTG
    Target_Device.Address_Filter: 192.168.xx.xx
    Target_Device.Filter_Type: IP
    Target_Device.Identity: TBD
    Device_Discovery.data
    Transaction_ID: 000138293
    Target_Device.Type: IPTG
    Target_Device.Address_Filter: 192.168.xx.xx
    Target_Device.Filter_Type: IP
    Target_Device.Identity: 192.168.12.22

In a case where it may be necessary to determine an actual or physical location of a wired IP telephone, any switches located between the IP telephone and the IPTG may be utilized to determine the actual location. In this regard, a client device discovery process may be adapted to have the capability to identify, for example an edge switch, which may be directly connected to the IP phone. Switch information, and/or wiring plan information, may be used to indicate the actual or physical location of a jack in which the IP telephone may be plugged. The switch may include suitable logic and/or software, which may be adapted to filter at least some or all Device_Discovery messages in a messaging protocol message and record some or all IP address and/or physical port mappings. The port may be an edge port in a spanning tree state, which may indicate that the IP telephone may not be connected to another switch. Accordingly, these records may subsequently be sent to the IPTG where it may be stored. Any future query for the physical location of that IP telephone may be answered by searching these records and extracting information from the stored records.

Figure 7:
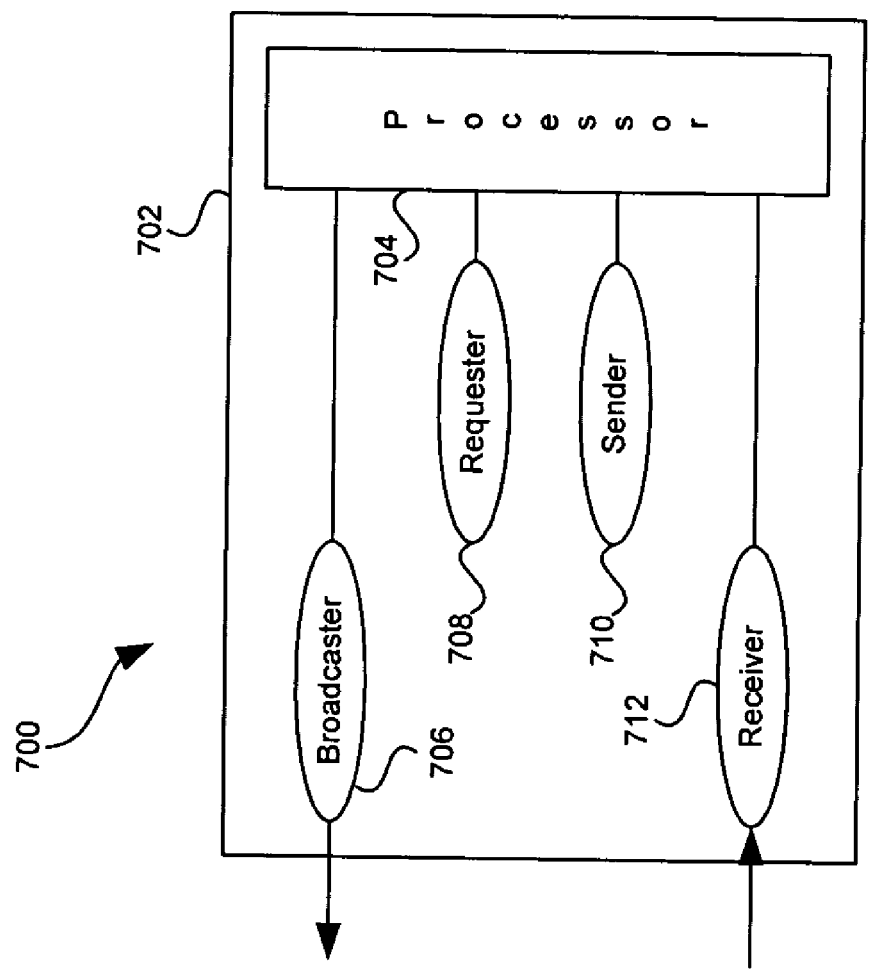
FIG. 7 is a block diagram of a server that may be adapted to discover end-points in accordance with an embodiment of the invention.

FIG. 7 is a block diagram 700 of a server 702 that may be adapted to discover end-points in accordance with an embodiment of the invention. Referring to FIG. 7, there is shown a processor 704, a broadcaster 706, a requester 708, a sender 710 and a receiver 712. The broadcaster 706, requester 708, sender 710 and receiver 712 may be variously coupled to processor 704. The broadcaster 706, requester 708, sender 710 and receiver 712 may contain suitable logic and/or software that may be adapted to facilitate the discovery of end-points in accordance with the invention.

The broadcaster 706 may be adapted to broadcast discovery messages to at least one of a plurality of access points. The receiver 712 may be adapted to receive a response from one or more of the access points. The response may report the presence of at least one access device located within a coverage area of the access points. The requester 708 may be adapted to request from one of the access points, a status of at least one access device located within a coverage area of one of the access points. The requester 708 may include a sender 710 adapted to send at least one status request message to one or more access points within whose coverage area the access device may be located.

The receiver 712 may be adapted to receive one or more status reply messages indicating a status of one or more access devices located within a coverage area of one or more of the access points. The broadcaster 706 may be further adapted to broadcast the discovery message to only those access points located in a particular subnetwork. The broadcaster 706, requester 708, sender 710 and receiver 712 may be may not be limited to the server 702, but may be adaptively integrated within a switch and/or one of the access points.

In accordance with another embodiment of the invention, dependent on the modulation scheme utilized, one or more of the PLCP frames illustrated in FIG. 1b, FIG. 1c, FIG. 1d and FIG. 1e may be adapted to contain information which may be utilized for communication in accordance with various embodiments of the invention. Additionally, the PLCP frames may be adapted to convey information for any one or more of the 801.11a, 802.11b and 802.11g modes of operation utilized by access points and/or access devices in accordance the embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing communication in a hybrid wired/wireless local area network, the method comprising: in a network device:
   broadcasting, by the network device, at least one discovery message to at least one of a plurality of access points within the hybrid wired/wireless local area network, wherein said at least one of said plurality of access points is operable to connect at least one device to the hybrid wired/wireless local area network;
   receiving, by the network device, a response from said at least one of said plurality of access points, said response reporting a presence of at least one access device located within a coverage area of said at least one of said plurality of access points, said at least one access device being separate and distinct from the network device and from said at least one of said plurality of access points; and
   requesting, by the network device, from said at least one of said plurality of access points, a status of said at least one access device located within said coverage area of said at least one of said plurality of access points by sending at least one status request message only to a particular one of said plurality of access points within whose coverage area said at least one access device is located.

2. The method according to claim 1, comprising, receiving from said particular one of said plurality of access points within whose coverage area said at least one access device is located, at least one status reply message indicating said status of said at least one access device.

3. The method according to claim 2, wherein one or more of the following: said at least one discovery message, said at least one status request message and said at least one status reply message is transmitted utilizing a messaging protocol of a device communication protocol umbrella.

4. The method according to claim 1, wherein said broadcasting comprises broadcasting said at least one discovery message from one or more of the following: a server, a switch and at least another one of said plurality of access points.

5. The method according to claim 4, wherein said broadcasting comprises broadcasting said at least one discovery message only to one or more of said plurality of access points located in a particular subnetwork of said hybrid wired/wireless local area network, said subnetwork with a particular IP address.

6. A non-transitory computer-readable medium, having stored thereon a computer program having at least one code section for providing communication in a hybrid wired/wireless local area network, the at least one code section executable by a computer for causing the computer to perform the steps comprising:

in a network device:
broadcasting, by the network device, at least one discovery message to at least one of a plurality of access points within the hybrid wired/wireless local area network, wherein said at least one of said plurality of access points is operable to connect at least one device to the hybrid wired/wireless local area network;
receiving, by the network device, a response from said at least one of said plurality of access points, said response reporting a presence of at least one access device located within a coverage area of said at least one of said plurality of access points, said at least one access device being separate and distinct from the network device and from said at least one of said plurality of access points; and
requesting, by the network device, from said at least one of said plurality of access points, a status of said at least one access device located within said coverage area of said at least one of said plurality of access points by sending at least one status request message only to a particular one of said plurality of access points within whose coverage area said at least one access device is located.

7. The computer-readable medium according to claim 6, comprising code for receiving from said particular one of said plurality of access points within whose coverage area said at least one access device is located, at least one status reply message indicating said status of said at least one access device.

8. The computer-readable medium according to claim 7, wherein one or more of the following: said at least one discovery message, said at least one status request message and said at least one status reply message is transmitted utilizing a messaging protocol of a device communication protocol umbrella.

9. The computer-readable medium according to claim 6, wherein said broadcasting code comprises code for broadcasting said at least one discovery message from one or more of the following: a server, a switch and at least another one of said plurality of access points.

10. The computer-readable medium according to claim 9, wherein said broadcasting code comprises code for broadcasting said at least one discovery message only to one or more of said plurality of access points located in a particular subnetwork of said hybrid wired/wireless local area network, said subnetwork with a particular IP address.

11. A system for providing communication in a hybrid wired/wireless local area network, the system comprising:

at least one broadcaster within a network device, the at least one broadcaster broadcasts at least one discovery message to at least one of a plurality of access points within the hybrid wired/wireless local area network, wherein said at least one of said plurality of access points is operable to connect at least one device to the hybrid wired/wireless local area network;
at least one receiver within the network device, the at least one receiver receives a response from said at least one of said plurality of access points, said response reporting a presence of at least one access device located within a coverage area of said at least one of said plurality of access points, said at least one access device being separate and distinct from the network device and from said at least one of said plurality of access points; and
a requester within the network device, the at least one requester requests from said at least one of said plurality of access points, a status of said at least one access device located within said coverage area of said at least one of said plurality of access points by sending at least one status request message only to a particular one of said plurality of access points within whose coverage area said at least one access device is located.

12. The system according to claim 11, wherein said at least one receiver receives from said particular one of said plurality of access points within whose coverage area said at least one access device is located, at least one status reply message indicating said status of said at least one access device.

13. The system according to claim 12, wherein one or more of the following: said at least one discovery message, said at least one status request message and said at least one status reply message comprises is transmitted utilizing a messaging protocol of a device communication protocol umbrella.

14. The system according to claim 11, wherein said at least one broadcaster broadcasts said at least one discovery message from one or more of the following: a server, a switch and at least another one of said plurality of access points.

15. The system according to claim 14, wherein said broadcaster broadcasts said at least one discovery message only to one or more of said plurality of access points located in a particular subnetwork of said hybrid wired/wireless local area network, said subnetwork with a particular IP address.

16. A system for providing communication in a hybrid wired/wireless local area network, the system comprising:

one or more circuits within a network device, said one or more circuits broadcast at least one discovery message to at least one of a plurality of access points within the hybrid wired/wireless local area network, wherein said at least one of said plurality of access points is operable to connect at least one device to the hybrid wired/wireless local area network;
said one or more circuits receive a response from said at least one of said plurality of access points, said response reporting a presence of at least one access device located within a coverage area of said at least one of said plurality of access points, said at least one access device being separate and distinct from the network device and from said at least one of said plurality of access points; and
said one or more circuits request from said at least one of said plurality of access points, a status of said at least one access device located within said coverage area of said at least one of said plurality of access points by sending at least one status request message only to a particular one of said plurality of access points within whose coverage area said at least one access device is located.

17. The system according to claim 16, wherein said one or more circuits receive from said particular one of said plurality of access points within whose coverage area said at least one access device is located, said at least one status reply message indicating said status of said at least one access device.

18. The system according to claim 17, wherein one or more of the following: said at least one discovery message, said at least one status request message and said at least one status reply message is transmitted utilizing a messaging protocol of a device communication protocol umbrella.

19. A system for providing communication in a hybrid wired/wireless local area network, the system comprising:
- at least one processor within a network device, said at least one processor tJ::1.at broadcasts at least one discovery message to at least one of a plurality of access points within the hybrid wired/wireless local area network, wherein said at least one of said plurality of access points is operable to connect at least one device to the hybrid wired/wireless local area network;
- said at least one processor receives a response from said at least one of said plurality of access points, said response reporting a presence of at least one access device located within a coverage area of said at least one of said plurality of access points, said at least one access device being separate and distinct from the network device and from said at least one of said plurality of access points; and
- said at least one processor requests from said at least one of said plurality of access points, a status of said at least one access device located within said coverage area of said at least one of said plurality of access points by sending at least one status request message only to a particular one of said plurality of access points within whose coverage area said at least one access device is located.

20. The system according to claim 19, wherein said at least one processor receives from said particular one of said plurality of access points within whose coverage area said at least one access device is located, at least one status reply message indicating said status of said at least one access device.

* * * * *

UNITED STATES PATENT AND TRADEMARK OFFICE
CERTIFICATE OF CORRECTION

| | | |
|---|---|---|
| PATENT NO. | : 8,254,346 B2 | Page 1 of 1 |
| APPLICATION NO. | : 10/606503 | |
| DATED | : August 28, 2012 | |
| INVENTOR(S) | : Jeyhan Karaoguz et al. | |

It is certified that error appears in the above-identified patent and that said Letters Patent is hereby corrected as shown below:

In the Claims:

Col. 20, line 22, in claim 13: after "reply message" delete "comprises"
Col. 21, line 4, in claim 19: replace "one processor tJ::1.at broadcasts at least" with
--one processor broadcasts at least--

Signed and Sealed this
Sixth Day of August, 2013

Teresa Stanek Rea
*Acting Director of the United States Patent and Trademark Office*